(12) United States Patent
Watsen et al.

(10) Patent No.: US 8,954,732 B1
(45) Date of Patent: Feb. 10, 2015

(54) AUTHENTICATING THIRD-PARTY PROGRAMS FOR PLATFORMS

(75) Inventors: Kent A. Watsen, Leesburg, VA (US); Alex Kolchinsky, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 34 days.

(21) Appl. No.: 13/534,268

(22) Filed: Jun. 27, 2012

(51) Int. Cl.
*H04L 29/06* (2006.01)
*H04L 9/32* (2006.01)

(52) U.S. Cl.
CPC .......... *H04L 9/3263* (2013.01); *H04L 63/0823* (2013.01)
USPC ................... 713/157; 713/176; 726/1; 726/2; 726/17; 726/30

(58) Field of Classification Search
CPC ... H04L 9/3263; H04L 63/0823; G06F 21/51; G06F 21/52; G06F 8/61; G06F 8/60
USPC ........ 713/157, 176; 726/1, 2, 17, 30; 717/164
See application file for complete search history.

(56) References Cited

U.S. PATENT DOCUMENTS

| | | | | |
|---|---|---|---|---|
| 4,868,877 | A * | 9/1989 | Fischer | 713/157 |
| 6,321,333 | B1 * | 11/2001 | Murray | 713/156 |
| 7,444,509 | B2 * | 10/2008 | Nadalin et al. | 713/156 |
| 7,877,600 | B2 * | 1/2011 | Qiu et al. | 713/157 |
| 8,020,001 | B2 * | 9/2011 | Lundblade et al. | 713/176 |
| 8,032,744 | B2 * | 10/2011 | Doonan et al. | 713/156 |
| 8,463,712 | B2 * | 6/2013 | Saito et al. | 705/76 |
| 2002/0091644 | A1 | 7/2002 | Wong et al. | |
| 2002/0147974 | A1 | 10/2002 | Wookey | |
| 2003/0055962 | A1 | 3/2003 | Freund et al. | |
| 2004/0025036 | A1 | 2/2004 | Balard et al. | |
| 2005/0005098 | A1 | 1/2005 | Michaelis et al. | |
| 2005/0125319 | A1 * | 6/2005 | Johnson | 705/30 |
| 2006/0064756 | A1 | 3/2006 | Ebert | |
| 2006/0100010 | A1 | 5/2006 | Gatto et al. | |
| 2006/0195208 | A1 | 8/2006 | Sammer et al. | |
| 2009/0254753 | A1 * | 10/2009 | De Atley et al. | 713/176 |

OTHER PUBLICATIONS

Matt Blaze et al. (Decentralized Trust Management, IEEE 1996).*
Ewen Denney et al. (Software Certification and Software Certificate Management Systems, SoftCeMent'05, 2005).*

(Continued)

*Primary Examiner* — Saleh Najjar
*Assistant Examiner* — Oleg Korsak
(74) *Attorney, Agent, or Firm* — Shumaker & Sieffert, P.A.

(57) ABSTRACT

In one example, a platform device includes a control unit configured to receive a first software package signed by a first software development entity with a first certificate of a first certificate hierarchy associated with the first software development entity, execute the first software package only after determining that a root of the first certificate hierarchy corresponds to a certificate authority of a developer of the platform device, receive a second software package signed by a second software development entity with a second certificate of a second certificate hierarchy associated with the second software development entity, wherein the second certificate hierarchy is different than the first certificate hierarchy, and execute the second software package only after determining that a root of the second certificate hierarchy corresponds to the certificate authority of the developer of the platform device.

20 Claims, 6 Drawing Sheets

(56) References Cited

OTHER PUBLICATIONS

Dwaine E. Clarke (SPKI/SDSI HTTP Server / Certificate Chain Discovery in SPKI/SDSI, Thesis, Sep. 2001).*
Microsoft (Code Signing Best Practices, Jul. 25, 2007).*
Jim Turnbull (Cross-Certification and PKI Policy Networking, Entrast, Aug. 2000).*
Cristina Satizábal et al. (PKI Trust Relationships: from a Hybrid Architecture to a Hierarchical Model, ARES'06, 2006).*
Chokhani et al. "Internet X.509 Public Key Infrastructure Certificate Policy and Certification Practices Framework" Network Working Group, Request for Comments: 2527, The Internet Society, Mar. 1999, 45 pgs.
Housley et al. "Internet X.509 Public Key Infrastructure Certificate and CRL Profile" Network Working Group, Request for Comments: 2459, The Internet Society, Jan. 1999, 129 pgs.
Younglove, Roger "PKI: How It Works", available at http://www.firstnetsecurity.comilibrary/lucent/PKIHowitworks.pdf, accessed May 23, 2012, Sep. 23, 2000, 4 pgs.

* cited by examiner

AUTHENTICATING THIRD-PARTY PROGRAMS FOR PLATFORMS

TECHNICAL FIELD

This disclosure relates to authenticating software as originating from a trusted source, and in particular, to techniques for managing authentication credentials.

BACKGROUND

In general, computer-based devices include hardware elements and software elements. The hardware elements, and certain software elements, may be collectively referred to as a "platform," and include elements such as processors, memory, interfaces such as network interfaces and display interfaces, and other such hardware elements, as well as certain software elements, such as an operating system. The software elements are used to cause the hardware elements to perform various functions. In some cases, separate entities create a platform and software for the platform. For example, an entity that creates a platform (referred to as a platform developer or a platform producer) may provide a software development kit (SDK) to entities that develop software for that platform. The entities that develop the software may further distribute the software to customers who purchase the platform and the software.

In some cases, the entity that created the platform may require that software developed by third parties be authenticated prior to being executed by the platform. Digital signatures and digital certificates are two mechanisms commonly used for purposes of authentication and verification within a computing environment. A digital signature is a processed version of a message that has been signed using encryption and decryption techniques, including the use of a private key of a sending device. To verify the digital signature, a receiving device applies a public key of the sending device. The receiving device may retrieve the public key directly from the sending device in the form of a certificate or from a trusted third party. A digital signature created with the private key of a mutually trusted third party, that is, a certification authority, ensures the integrity of the sending device's certificate.

In this manner, customers who purchase and deploy the platform can be assured that they are utilizing software from a legitimate source. Typically, the platform will be designed to ensure that software is signed by a trusted entity before installing and executing the software. The platform may, for example, authenticate the software using a chain of trust leading up to the certificate authority associated with the platform producer. That is, all software that is to be executed on the platform must conform to this requirement that the software can be authenticated up through the chain of trust back to a certificate authority for the platform producer. To accelerate authentication, a platform often maintains an internal trust store that lists the certification authorities trusted by the platform. For example, a platform may utilize the internal trust store to authenticate a software package prior to installing the software package to ensure that the software package originates from a trustworthy source and has not been altered.

Certain conventional techniques for signing software include issuing a certificate, including a code-signing key, from the certificate authority of the platform provider to each software developer. Actors within the software development entity, i.e., the third party software developer, sometimes freely share the code-signing key, using the shared certificate to sign software created for the platform. Allowing a code-signing key to be shared among different actors, however, is a violation of security best practices.

Other conventional techniques include having the platform producer, or a certificate authority associated with the platform producer, issue multiple code-signing keys to the software developer, one for each actor within the $3^{rd}$ party software develop. However, these techniques place a heavy burden on the certificate authority. Moreover, certificate authorities often charge for the service of issuing a certificate, meaning that these techniques lead to increased costs for the software developer.

Still other conventional techniques include the platform developer setting up and maintaining a local signing server on-site within the software developer's enterprise. That is, a single certificate may be issued to the software developer, which may set up a dedicated server for signing software using that certificate. However, in order to satisfy security best practices, such a server should be a stand-alone machine that is dedicated only to the task of signing software with the certificate, which can lead to increased capital expenses. Likewise, the server must be maintained, which can lead to increased operational expenses.

Yet other conventional techniques include sending the software to a remote signing server, such as a server managed by the platform producer. However, these techniques may consume a tremendous amount of bandwidth, in that the entire software package may need to be transmitted to the remote signing server repeatedly throughout the software development cycle. When network throughput is not high enough, this may also lead to increases in latency. Moreover, these techniques may be vulnerable to entropy attacks initiated by malicious users, which may be used to maliciously obtain the private key.

SUMMARY

In general, this disclosure describes techniques for simply and efficiently authenticating software developed by a third party for a platform. In general, it is assumed that the platform producer requires that the software be authenticated (e.g., signed using a certificate) in order to run on the platform. In accordance with the techniques of this disclosure, a software development entity for a platform receives a certificate from an entity that developed the platform. Using this certificate, the software development entity develops their own certificate infrastructure, allowing individual actors to generate their own private keys and request certificate signing for those keys.

For example, the software development entity may be structured as a set of departments, each of the departments including individual actors. The certificate from the platform producer can be used to sign department-level certificates, granting those certificates the ability to sign sub-certificates. However, the sub-certificates may be prevented from signing further certificates. The department-level certificates can be set to expire after a relatively long time, while actor-level certificates can be set to expire after a relatively short time. Different software development entities can set up individual certificate authority hierarchies that are appropriate for the respective software development entities.

In this manner, the techniques of this disclosure avoid key sharing among various entities, which preserves security best practices. Moreover, these techniques can be used to construct a chain of trust from the platform producer to a software development entity, and all the way down to individual actors within the software development entity. Thus, individual actors can sign their own work product, assuming those actors are trusted and provided with a valid certificate. Accordingly, the work product (e.g., software modules, object code, executable files, or the like) can be signed as authentic without needing to be transmitted over a network and without the use of a dedicated signing server device. Therefore, these techniques can be used to efficiently authenticate third party software for a platform without incurring significant expenses.

In one example, a method includes receiving, by a platform device, a first software package signed by a first software development entity with a first certificate of a first certificate hierarchy associated with the first software development entity, wherein the first certificate hierarchy conforms to a first hierarchical structure of the first software entity, executing, by a control unit of the platform device, the first software package only after determining that a root of the first certificate hierarchy corresponds to a certificate authority of a developer of the platform device, receiving, by the platform device, a second software package signed by a second software development entity with a second certificate of a second certificate hierarchy associated with the second software development entity, wherein the second certificate hierarchy conforms to a second hierarchical structure of the second software entity, and wherein the second certificate hierarchy is different than the first certificate hierarchy, and executing, by the control unit of the platform device, the second software package only after determining that a root of the second certificate hierarchy corresponds to the certificate authority of the developer of the platform device.

In another example, a platform device includes a control unit configured to receive a first software package signed by a first software development entity with a first certificate of a first certificate hierarchy associated with the first software development entity, wherein the first certificate hierarchy conforms to a first hierarchical structure of the first software entity, execute the first software package only after determining that a root of the first certificate hierarchy corresponds to a certificate authority of a developer of the platform device, receive a second software package signed by a second software development entity with a second certificate of a second certificate hierarchy associated with the second software development entity, wherein the second certificate hierarchy conforms to a second hierarchical structure of the second software entity, and wherein the second certificate hierarchy is different than the first certificate hierarchy, and execute the second software package only after determining that a root of the second certificate hierarchy corresponds to the certificate authority of the developer of the platform device.

In another example, a computer-readable storage medium includes, e.g., is encoded with, instructions that, upon execution, cause a processor to receive a first software package signed by a first software development entity with a first certificate of a first certificate hierarchy associated with the first software development entity, wherein the first certificate hierarchy conforms to a first hierarchical structure of the first software entity, execute the first software package only after determining that a root of the first certificate hierarchy corresponds to a certificate authority of a developer of the platform device, receive a second software package signed by a second software development entity with a second certificate of a second certificate hierarchy associated with the second software development entity, wherein the second certificate hierarchy conforms to a second hierarchical structure of the second software entity, and wherein the second certificate hierarchy is different than the first certificate hierarchy, and execute the second software package only after determining that a root of the second certificate hierarchy corresponds to the certificate authority of the developer of the platform device.

In another example, a method includes receiving a certificate from a certificate authority associated with a developer of a type of platform device, constructing a certificate hierarchy including a plurality of hierarchically arranged certificates including, as a root of the certificate hierarchy, the certificate from the certificate authority associated with the developer of the platform device, signing data of a software package developed for the type of platform device using one or more certificates of the certificate hierarchy, and providing the signed software package and data for the certificate hierarchy to one or more platform devices of the type of platform device developed by the developer.

The details of one or more examples are set forth in the accompanying drawings and the description below. Other features, objects, and advantages will be apparent from the description and drawings, and from the claims.

DETAILED DESCRIPTION

Figure 1:
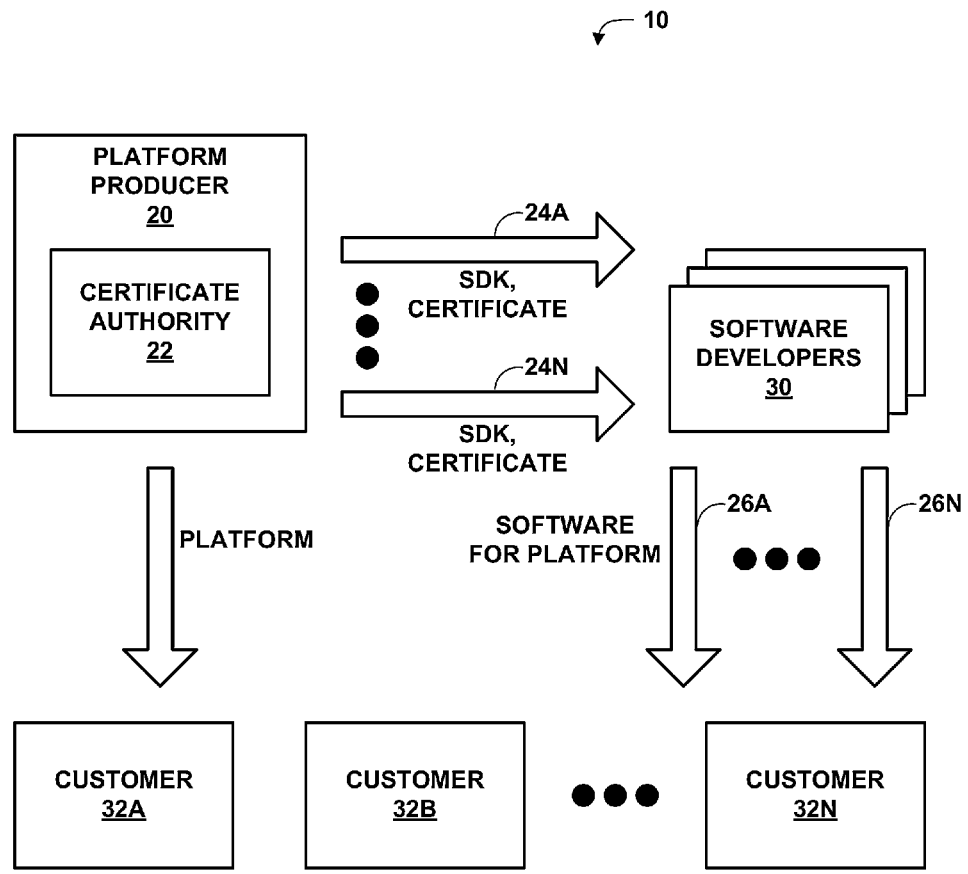
FIG. 1 is a block diagram illustrating an example system in which separate entities produce a platform and software for the platform.

FIG. 1 is a block diagram illustrating an example system 10 in which separate entities produce a platform and software for the platform. In this example, system 10 includes platform producer 20, software developers 30, and customers 32A-32N (customers 32). Software developers 30 represent examples of respective software development entities. In general, platform producer 20 produces a platform, such as a computing device, a network device (e.g., a router, switch, hub, gateway, firewall, intrusion detection and/or prevention device, or the like), a mobile device such as a smart phone or tablet computing device, or other such platforms. Software developers 30 develop software for the platform. For example, as shown in FIG. 1, platform producer 20 may provide a software development kit (SDK) to software developers 30 to assist in the development of software for the platform.

It is assumed in this example that software developers 30 represent separate entities from platform producer 20. As such, software developers 30 may be considered third parties relative to platform producer 20. Platform producer 20 requires that third party software be authenticated before the third party software is executed by a platform produced by platform producer 20. In particular, customers 32 purchase the platform from platform producer 20 (or an intermediate entity), and the platform produced by platform producer 20 is ultimately sent to customers 32, as shown in FIG. 1. Likewise, customers 32 receive data 26A-26N (data 26) from software developers 30, where data 26 represents software developed for the platform. In this manner, data 26 defines third party software for the platform.

As noted above, platform producer 20 requires that such third party software be authenticated before being executed, and in some cases even installed. In accordance with the techniques of this disclosure, platform producer 20 includes certificate authority 22. Certificate authority 22 grants a unique certificate to each of software developers 30. In general, the certificate represents an authentication for the party granted the certificate. In this manner, as shown in FIG. 1, platform producer 20 may send data 24A-24N (data 24) including both an SDK for developing software for the platform and a unique certificate to each of software developers 30. Although described as one set of data including both the SDK and the certificate, in practice, the data for the SDK and the certificate may be sent separately.

Certificates are used in public key cryptography, in which two keys, a public key and a private key, are used to encrypt, decrypt, sign, and/or verify data. In particular, to ensure that only one party can read data, the public key of that party can be used to encrypt that data, such that only the party's private key can be used to decrypt the data. Conversely, to ensure that data can be authenticated as having originated from a particular party, that party can use its private key to perform an encryption/decryption process on the data, typically referred to as "signing" the data, and its public key can be used as part of an encryption/decryption process to verify the data. For purposes of explanation, this disclosure refers to signing data as performing an encryption/decryption process on the data with a private key. However, it should be understood that to sign a set of data, a fingerprint of the data may be signed using the private key, where the fingerprint is generally substantially smaller than the data itself. The fingerprint may correspond to a hash of the data itself, such as an MD5 (Message Digest 5) hash or a SHA-1 (secure hash algorithm-1) hash of the data. Certificate authority 22 signs certificates issued to software developers 30, e.g., by encrypting data for the certificates with a private key associated with certificate authority 22. In this manner, entities attempting to verify that the certificate was signed by certificate authority 22 can verify the certificate using the public key associated with certificate authority 22.

As one example, signing a set of data may include calculating a hash of the data, producing a fingerprint of the data, then applying a decryption process using a private key to the fingerprint of the data to produce a signature. Verification of the signed data may include determining whether a hash of the data (that is, the fingerprint) is equal to the result of encrypting the signature using the public key paired with the private key. These processes represent examples of encryption/decryption processes for signing and/or verifying data using public key cryptography.

In accordance with the techniques of this disclosure, the certificates sent to software developers 30 allow software developers 30 to create their own local certificate authority infrastructure. In particular, the certificates granted to software developers 30 are configured to allow signing of sub-certificates within the respective entities. For example, using the certificate received from certificate authority 22 of platform producer 20, a security officer of one of software developers 30 may sign certificates for individual departments within the corresponding software developer, and allow these department-level certificates to sign further sub-certificates, e.g., of individual programmers within the respective department. As another example, a different one of software developers 30 may create only a two-level hierarchy, including the certificate from certificate authority 22 and certificates for individual programmers. An example certificate authority hierarchy is illustrated and described in greater detail with respect to FIG. 2.

By allowing each of software developers 30 to develop their own unique certificate authority hierarchies, each of software developers 30 can ensure that individual actors have their own unique private keys. For example, individual actors can generate their own public key/private key pairs and generate a certificate signing request for the public key/private key pair to request a certificate signed using the certificate received from certificate authority 22, or a sub-certificate thereof. Accordingly, because each actor has their own private key, private keys need not be shared among actors of software developers 30. In this manner, these techniques allow software developers 30 to conform with security best practices of not sharing private keys among different actors, while still establishing a chain of trust to certificate authority 22 of platform producer 20.

Moreover, because each actor has a respective private key, certificate revocation and expiration can be performed on a fine grain basis. For example, if an individual actor leaves the software development entity, the software developer can revoke that actor's certificate individually, without concern that other actors' keys will be compromised. Likewise, if certificate authority 22 determines that one of software developers 30 is not in compliance with requirements for retaining the certificate from certificate authority 22, certificate authority 22 can simply revoke the one certificate associated with the one of software developers 30. In effect, this causes all certificates issued by the one of software developers 30 to be revoked as well, because the chain of trust can no longer be traced back to certificate authority 22.

Moreover, end of life (EOL) policies for certificates can be established uniquely for each of software developers 30, e.g., by security officers of software developers 30. Certificates at different levels of the certificate authority hierarchy of respective software developers 30 can be assigned different expiration dates. For example, certificates used exclusively for signing sub-certificates may be relatively long-lived (e.g., having a twenty year expiration). Such certificates may be stored on a computing device that is not connected to a network and that is only turned on when a sub-certificate needs to be signed. Build servers, on the other hand, may receive a certificate that expires in a shorter period of time (e.g., three years), but receive periodic renewals (e.g., each month). In this manner, a particular software build would need to be installed at most three years after the software was built by the build server, or else the software could not be installed and executed.

As still another example, individual actors, such as programmers, can be issued certificates that are rendered useless for production use, but are instead useful only during software development. For example, their certificates can be set to expire six months after signing. Moreover, certificates assigned to individual actors may include personal information, such as the individual's name, such that the individual actors do not want to distribute anything signed with that certificate outside of the software developer. Thus, certificates assigned to individual actors can be configured with a relatively small exposure window and without anonymity, which encourages the individual actors to provide their software contributions to the build server and discourages the individual actors from disseminating their software outside of the respective one of software developers 30. In this manner, rather than having individual actors sign their contributions to a software package, the actors can submit their contributions to a build server, which has its own certificate, and the build server can build the software package and sign the package with its own certificate. The build server can use signed contributions from individual actors to ensure that the software contributions originate from authorized actors.

In this manner, software developers 30 can construct their own certificate hierarchies that are specific to their companies. Whereas smaller software development entities may only require a few certificates, larger software development entities may require a relatively large, multi-tiered certificate hierarchy. Certificate authority 22 of platform producer 20 issues one certificate to each of software developers 30, which includes permissions to sign sub-certificates. In this manner, software developers can use the certificate from certificate authority 22 to sign sub-certificates, which may be in turn used to sign further sub-certificates. Sub-certificates may be issued and authorized recursively in this manner down to individual actors. Sub-certificates at a lowest level of the hierarchy may be restricted from signing further sub-certificates.

Using these techniques allows flexibility for constructing certificate hierarchies within each of software developers 30, while also preserving security best practices. Moreover, data for a software package need not be sent outside of the one of software developers 30 that developed the software package for signing, but can instead be signed by a certificate of the certificate hierarchy, having a root at the certificate associated with certificate authority 22, of the one of software developers 30 that developed the software package.

In accordance with the techniques of this disclosure, platform devices purchased by customers 32 may be configured to receive a first software package (such as data 26A) signed by a first software developer (that is, a first one of software developers 30) with a first certificate of a first certificate hierarchy associated with the first software developer. The platform devices execute the first software package only after determining that a root of the first certificate hierarchy corresponds to a certificate associated with certificate authority 22 of platform producer 20. Certificates associated with certificate authority 22 are considered self-signed, in that platform producer 20 is implicitly trusted by platform devices produced by platform producer 20.

Likewise, the platform devices may receive a second software package signed by a second software developer (that is, a different one of software developers 30) with a second certificate of a second certificate hierarchy associated with the second software developer. The second certificate hierarchy may be different than the first certificate hierarchy, because the techniques of this disclosure allow each of software developers 30 to develop their own unique certificate hierarchies. The platform devices execute the second software package only after determining that a root of the second certificate hierarchy corresponds to a certificate associated with certificate authority 22 of platform producer 20.

Figure 2:
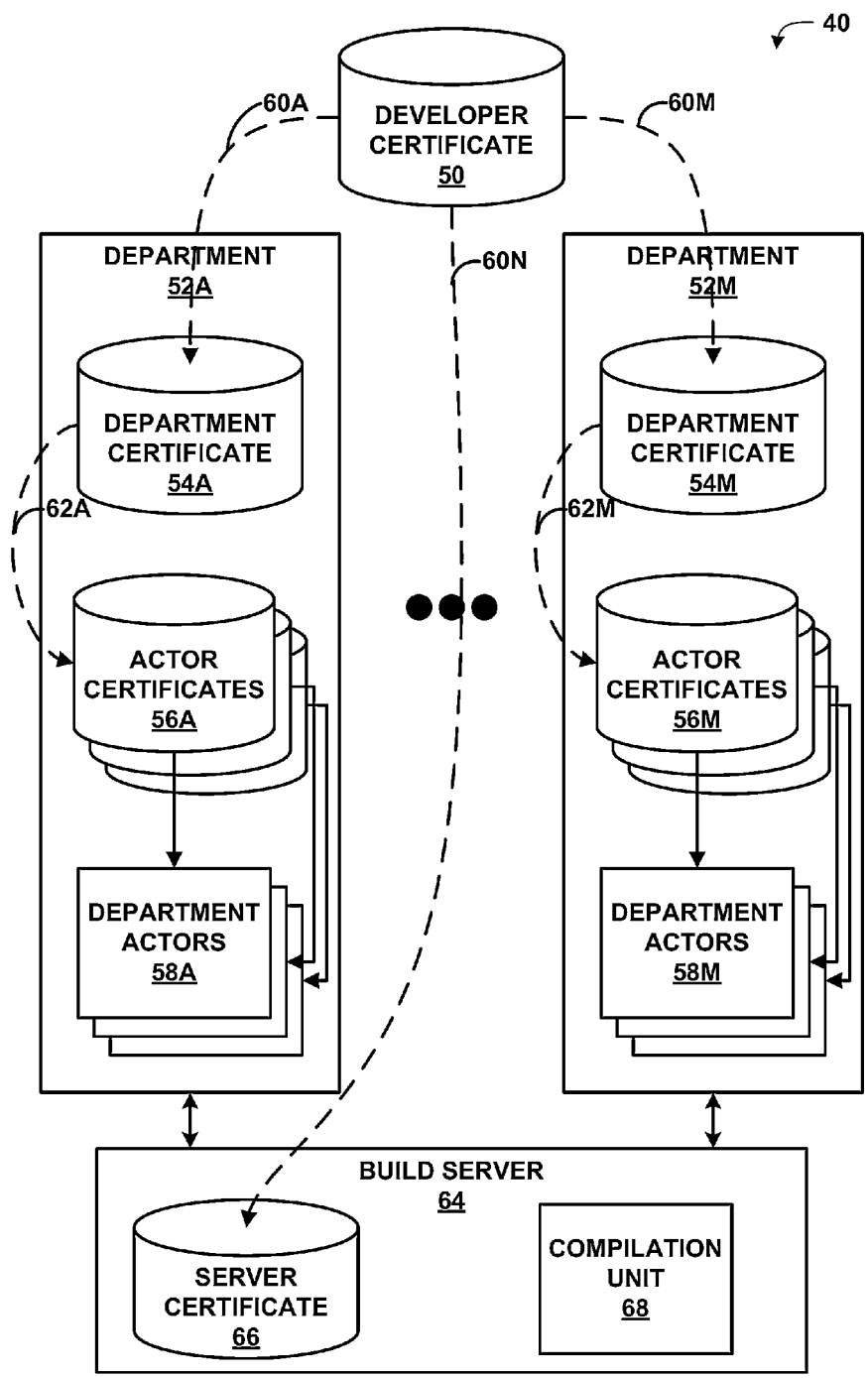
FIG. 2 is a block diagram illustrating an example organizational structure of a software developer, including certificates signed to individual actors within software developer.

FIG. 2 is a block diagram illustrating an example organizational structure of a software developer 40, including certificates signed to individual actors within software developer 40. Software developer 40 represents an example of a software development entity, e.g., an entity for developing software arranged according to multiple hierarchical levels and one or more actors at each hierarchical level. Software developer 40 also represents an example of one of software developers 30 of FIG. 1. However, it should be understood that other organizational structures of software developers may be used in accordance with the techniques of this disclosure.

In this example, software developer 30 is divided into departments 52A-52M (departments 52). Departments 52 represent any of a variety of departments involved in software development, such as, for example, a core system department, a database department, a networking department, a user interface department, a human interface device (HID) department, a testing and debugging department, and the like. Each of departments 52 includes a number of department actors 58. For example, department 52A includes department actors 58A, while department 52M includes department actors 58M. Department actors 58 generally represent individual actors involved in software development, such as programmers, managers, testers, and the like. Department actors 58 work together and individually to develop features of a software package related to their respective department.

It is assumed that software developer 40 has its organizational structure in place prior to utilization of the techniques of this disclosure. However, it is also possible that the techniques of this disclosure may be used in conjunction with developing an organizational structure for a software developer, or during reorganization of a software developer. In any case, a member of software developer 40, such as a security specialist, ensures that each of department actors 58 maintains their own public key and private key pair. The security specialist may initially issue a certificate request to certificate authority 22 (FIG. 1). In response, the security specialist may receive developer certificate 50. Developer certificate 50 generally includes a public key for software developer 40, certificates in a certificate chain for platform producer 20 (e.g., one or more certificates associated with certificate authority 22), and a signature produced by one of the certificates of the certificate chain for platform producer 20.

Based on the organizational structure of software developer 40, the security specialist may determine that each of departments 52 receives its own department certificate, such as one of department certificates 54A-54M (department certificates 54). Department certificates 54 are signed by developer certificate 50. That is, a member of each of departments 52, such as a department manager, may issue certificate requests to the security specialist, who may use developer certificate 50 to sign department certificates 54 to respective departments 52, represented by dashed lines 60A-60M.

Moreover, each of department actors 58 can issue certificate requests for their public key and private key pair to, e.g., the department manager of the respective one of departments 52. In response, department actors 58 may be issued individual actor certificates, such as actor certificates 56A-56M (actor certificates 56). Actor certificates 56 are signed by respective department certificates 54, represented by dashed lines 62A-62M.

Furthermore, in this example, software developer 40 includes build server 64. Build server 64 includes compilation unit 68 and server certificate 66. Server certificate 66 is signed by developer certificate 50, represented by dashed line 60N. In other examples, server certificate 66 may be signed by a different certificate, e.g., one of department certificates 54. In any case, in this example, department actors 58 provide code elements, signed by respective actor certificates 56, to build server 64, for inclusion within a software package. Build server 64 authenticates the code elements by ensuring that they are signed using a valid one of actor certificates 56.

In general, to sign data, such as a code element, an actor performs an encryption/decryption process on the data using the actor's private key. To authenticate (or verify) the data, that is, ensure that the data originated from the actor, another actor can perform an encryption/decryption process on the data using the actor's public key. The encryption/decryption process is not used to secure the data, because the actor's public key is generally publicly available, but instead is used to authenticate the origins of the data. That is, because the actor is the only one with access to the private key used to sign the data, data that can be properly verified using the actor's public key can be verified as originating from that actor. Build server 64 authenticates code elements in this manner, and moreover, ensures that the certificates associated with the public key can be traced back to developer certificate 50. That is, build server 64 recursively checks the certificate used to sign each certificate, until reaching developer certificate 50. For example, build server 64 may determine that one of actor certificates 56 is signed by one of department certificates 54, and that the one of department certificates 54 is signed by developer certificate 50. In this manner, build server 64 may walk the chain of trust from the actor up to developer certificate 50.

In this manner, FIG. 2 illustrates an example certificate hierarchy for an example software developer 40. In this example, a root of the certificate hierarchy corresponds to developer certificate 50. The root could also be described as "level 1" of the hierarchy. Developer certificate 50 is used to sign department certificates 54 and server certificate 66. Therefore, department certificates 54 and server certificate 66 represent certificates at "level 2" of the hierarchy. Actor certificates 56 are signed by respective department certificates 54, and therefore represent certificates at "level 3" of the hierarchy.

Accordingly, a certificate hierarchy may be described as a tree of nodes, the nodes corresponding to certificates, where each node has exactly one parent node and zero or more child nodes. The root of the tree corresponds to developer certificate 50, received from certificate authority 22 in this example, and exists at level 1 of the hierarchy. Each node at level N, where N is greater than 1, represents a certificate signed by a parent node at level N−1. Thus, a certificate at level N, where N>1, is signed by at least one certificate at level N−1, in this example. By verifying this property of the certificate hierarchy, starting with the certificate used to sign a code element, the code element can be authenticated.

After receiving and authenticating each code element for a software package, compilation unit 68 of build server 64 compiles the various code elements to form the software package. In various examples, the code elements may include source code, object code, executable files, configuration data, or other such elements used in producing a software package. Build server 64 may then sign the software package using server certificate 66.

Build server 64, or another entity of software developer 40, may also make the software package available to platforms of the type for which the software package was created, e.g., platforms corresponding to a software development kit (SDK) received from platform producer 20. Build server 64 may, for example, provide the software package directly to consumers 32 (FIG. 1) in the form of instructions stored on a computer readable medium or via network transmission, or may send data for the software package to an online repository, such as an application marketplace.

In addition to the software package, build server 64 may also provide certificates of the certificate hierarchy for software developer 40 to the platforms. In this manner, the platforms can use the certificates of the certificate hierarchy to authenticate the software package. That is, the platforms may authenticate the software as originating from a trusted software developer in a manner similar to build server 64. With respect to the example of FIG. 2, the platforms may determine that the software package was signed by server certificate 66, that server certificate 66 was signed by developer certificate 50, and that developer certificate 50 was signed by certificate authority 22. In other words, the platforms may ensure that the certificate used to sign the software package exists within the certificate hierarchy, that level 1 of the certificate hierarchy (that is, the root of the certificate hierarchy) is a certificate associated with certificate authority 22, and for each certificate at level N (where N>1) along a path from the root node to the certificate used to sign the software package, the certificate at level N is signed by a certificate at level N−1 along that path.

Thus, because the platforms are configured to trust certificate authority 22 and determine that the certificate hierarchy has a root corresponding to certificate authority 22 (namely, developer certificate 50 signed by certificate authority 22), the platforms can install and execute the software package. On the other hand, if a software package cannot be authenticated as originating from a trusted source, the platforms may delete data for the software package without installing the software package.

The organizational structure of software developer 40 of FIG. 2 is merely one example organizational structure. It should be understood that the techniques of this disclosure allow for creation of a certificate hierarchy for software development entities, such as software developers 30 of FIG. 1, for any sort of organizational structure. In particular, each actor of the software developer creates their own public key and private key pairs and issues certificate requests for the pairs. The software developer receives a certificate from certificate authority 22, which permits signing of sub-certificates. Thus, the software developer signs the certificate requests from the individual actors using either the certificate received from certificate authority 22 or a sub-certificate thereof. A sub-certificate of the certificate received from certificate authority 22 is a certificate either signed by the certificate received from certificate authority 22 or a certificate that was signed by another sub-certificate of the certificate received from certificate authority 22.

The software developer may use some certificates only for signing other certificate requests. In the example of FIG. 2, department certificates 54 are only used for signing sub-certificates, that is, actor certificates 56. Such certificates used only for signing sub-certificates may be stored on a computing device that is not connected to a network of the software developer and only powered on when a certificate signing request needs to be acted upon, that is, when a sub-certificate needs to be signed. The software developer may create an end-of-life (EOL) policy for the certificates at various levels of the certificate authority hierarchy based on, for example, who the certificates belong to, how they are used (e.g., for signing sub-certificates, data associated with a software package, or internal authentication only). For example, department certificates 54 may be long-lived certificates having a 20-year expiration, server certificate 66 may have a 3-year expiration, and actor certificates 56 may have a 6-month expiration.

Figure 3:
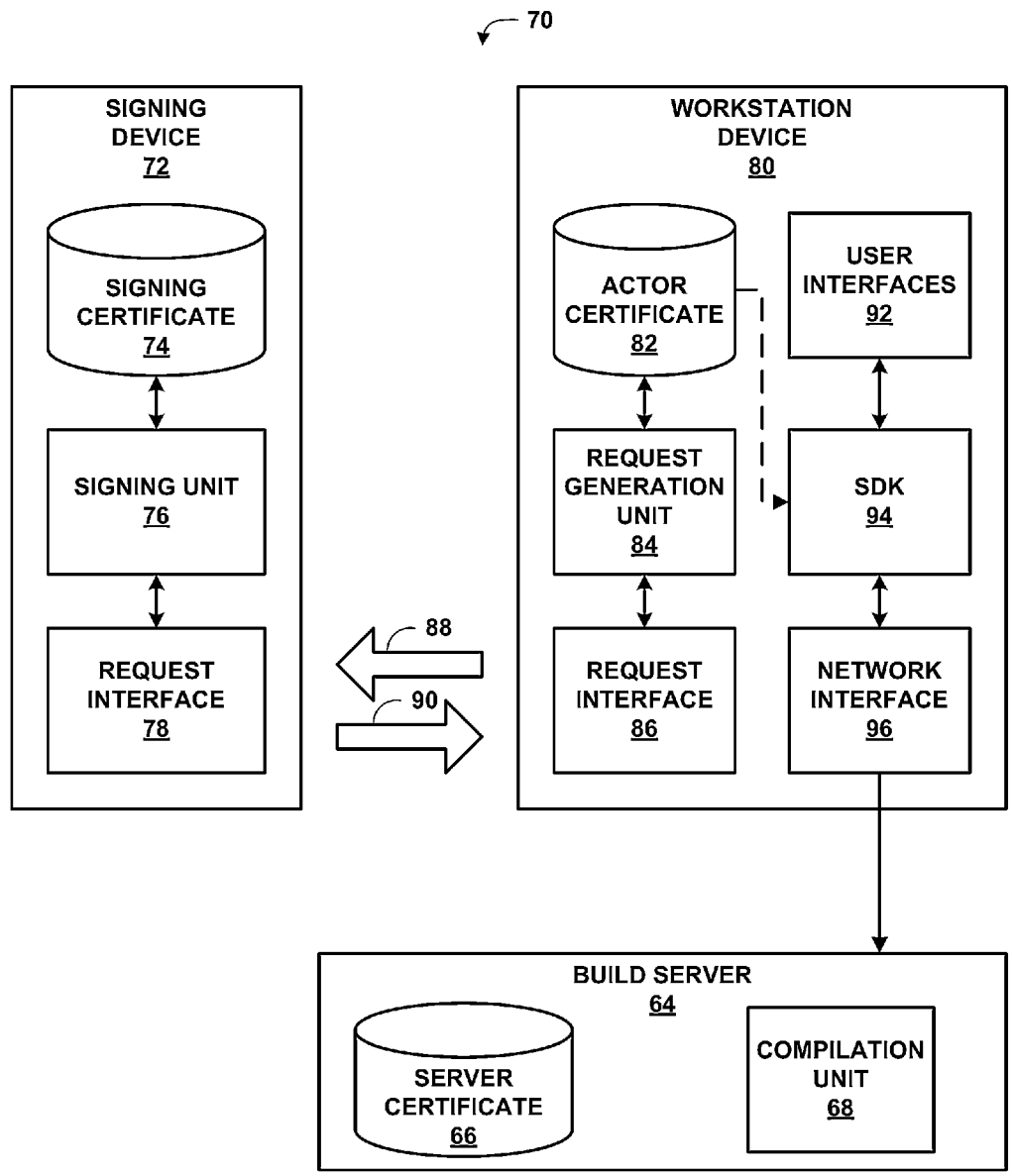
FIG. 3 is a block diagram of a system of devices that may be used in accordance with the techniques of this disclosure.

FIG. 3 is a block diagram of a system 70 of devices that may be used in accordance with the techniques of this disclosure. System 70 may correspond to devices within one of departments 52 of FIG. 2. In this example, system 70 includes signing device 72 and workstation device 80. In general, signing device 72 is a device used to sign sub-certificates for workstation devices, such as workstation devices 80. Workstation device 80 represents an example of a device used by an individual actor, such as a programmer, of a software development entity.

For example, an individual actor may use workstation device 80 to create a public key and a private key pair. This public key and private key pair is used to digitally encrypt, decrypt, sign, and/or verify (or authenticate) data. For example, other entities may encrypt data using the public key, such that only workstation device 80 is able to decrypt the data using the private key. Likewise, workstation device 80 may sign data using the private key such that other entities are able to verify the data using the public key, indicating that the origin of the data must have been workstation device 80, because only workstation device 80 has access to the private key.

Workstation device 80 includes request generation unit 84 and request interface 86. Request generation unit 84 is configured to generate a certificate signing request for the public key and private key pair. The certificate signing request generally includes data for the public key and a request for a certificate signed by the entity to whom the certificate signing request is issued, e.g., signing device 72. The certificate, after being issued, indicates that the public key does indeed belong to the requesting entity, e.g., workstation device 80 (or a user thereof). Request generation unit 84 provides the data for the certificate signing request to request interface 86.

Request interface 86 represents an interface for outputting the certificate signing request, represented by arrow 88. As an example, request interface 86 may represent a universal serial bus (USB) interface for storing the data for the certificate signing request to a USB-based flash drive. Thus, to output the certificate signing request, request interface 86 may store the data for the certificate signing request to the USB flash drive. A user, such as the individual actor associated with workstation device 80, a supervisor thereof, or a security officer, may then take the USB flash drive to signing device 72. Typically, to enhance security, signing device 72 would not be connected to a network, to prevent unauthorized access. Likewise, signing device 72 may be kept off until a certificate needed to be signed. However, in some examples, signing device 72 may be kept powered on and available via a network. In such examples, request interface may comprise a network interface, such as an Ethernet-based network interface card (NIC), or other wired or wireless interface.

Signing device 72, in this example, includes signing certificate 74, signing unit 76, and request interface 78. Request interface 78 generally corresponds to an interface substantially similar to request interface 86. For example, when request interface 86 comprises a USB interface, request interface 78 also comprises a USB interface. In this example, request interface 78 receives the data for the certificate signing request, represented by arrow 88, from workstation device 80. Request interface 78 passes the certificate signing request to signing unit 76.

In this example, as noted above, signing device 72 includes signing certificate 74. Signing certificate 74 may represent a certificate signed by certificate authority 22 (that is, a certificate signed by a separate entity) or a sub-certificate thereof. For example, signing certificate 74 may represent developer certificate 50 or one of department certificates 54 of FIG. 2. Signing unit 76 uses data of signing certificate 74 to sign the certificate of the certificate signing request from workstation device 80. In some cases, signing unit 76 may require separate authentication of a user processing the certificate signing request, such as a login identifier and a password.

More particularly, signing certificate 74 is associated with a public key and private key pair of signing device 72. Signing certificate 74 is signed by another entity, such as another entity within the software developer including signing device 72 and workstation device 80, or by certificate authority 22 (FIG. 1). Thus, signing certificate 74 forms part of a certificate hierarchy for the software developer. That is, signing certificate 74 is signed by either a certificate signed by certificate authority 22 or a sub-certificate thereof, and therefore is treated as a sub-certificate of certificate authority 22. Signing certificate 74 indicates that the public key for signing device 72 can be trusted as being associated with signing device 72. Signing unit 76 uses the paired private key of signing device 72 to sign the certificate for the certificate signing request issued by workstation device 80. Signing unit 76 then provides data for signing certificate 74 (including other certificates and corresponding public keys in the certificate hierarchy) to request interface 78.

Request interface 78, in turn, outputs data representative of the signed certificate, e.g., to the USB flash drive including the certificate signing request. This data is then provided back to workstation device 80, as represented by arrow 90. Request interface 86 receives the data corresponding to the signed certificate, and provides this data to request generation unit 84. Request generation unit 84, in turn, stores the data for the signed certificate in the form of actor certificate 82. Because signing certificate 74 can be traced back along the certificate hierarchy to certificate authority 22, and because signing certificate 74 was used to authenticate actor certificate 82, actor certificate 82 can likewise be traced back along the certificate hierarchy to certificate authority 22.

Workstation device 80 also includes user interfaces 92, software development kit (SDK) 94, and network interface 96. The individual actor associated with workstation device 80, such as a programmer, uses user interfaces 92 to interact with workstation device 80. User interfaces 92 may include, for example, a keyboard, a mouse, a monitor, speakers, a microphone, a camera, a webcam, a touchscreen, or the like. In this manner, workstation device 80 receives input from and provides output to the individual actor via user interfaces 92.

SDK 94 represents an SDK from platform producer 20 (FIG. 1). Although shown as an individual element, it should be understood that SDK may be incorporated into a software development suite, such as an integrated development environment (IDE), or generally used in conjunction with other elements. For example, a control unit of workstation 80 may execute the SDK as an application along with other applications. The SDK may be executed over an operating system of workstation device 80. The control unit may comprise one or more hardware-based processing units, such as one or more microprocessors, and memory for storing instructions for the SDK and other applications.

In accordance with the techniques of this disclosure, the individual actor associated with workstation device 80 uses SDK to develop software elements for a particular platform. The software elements correspond to a portion of a software package developed for the platform. The SDK provides tools for building such software elements, such as dynamically linked libraries (DLLs) provided by the platform, application programming interfaces (APIs) provided by the platform, emulation of platform software and/or hardware elements, or other such tools. In this manner, the individual actor can produce software elements designed for the corresponding platform.

After developing such software elements, workstation device 80 signs data for the software elements, such as source or object code, using actor certificate 82. That is, workstation device 80 uses the private key of the public key and private key pair associated with actor certificate 82 to sign the data for the software elements. This allows workstation device 80 to test these software elements on a test kit, including a test platform device (not shown). The test platform device is configured in a manner that conforms substantially to the platform produced by platform producer 20, such that the test platform device only executes authentic, signed software. After testing the software elements to ensure that the software elements work properly, workstation device 80 provides data for the software elements to build server 64. For example, workstation device 80 may "check in" the software elements using a software version control system, such as CVS (concurrent version system).

As explained above, build server 64 receives such software elements from other actors involved in the development of a software package for the platform, in addition to the actor associated with workstation device 80. Compilation unit 68 of build server 64 generates the software package using these software elements and signs data for the software package (e.g., all or a portion of the software package) using the private key associated with server certificate 66 to sign the software package. Then, build server 64 can provide the signed software package, along with data for the certificate hierarchy, to platform devices of the type of platform device corresponding to SDK 94.

Figure 4:
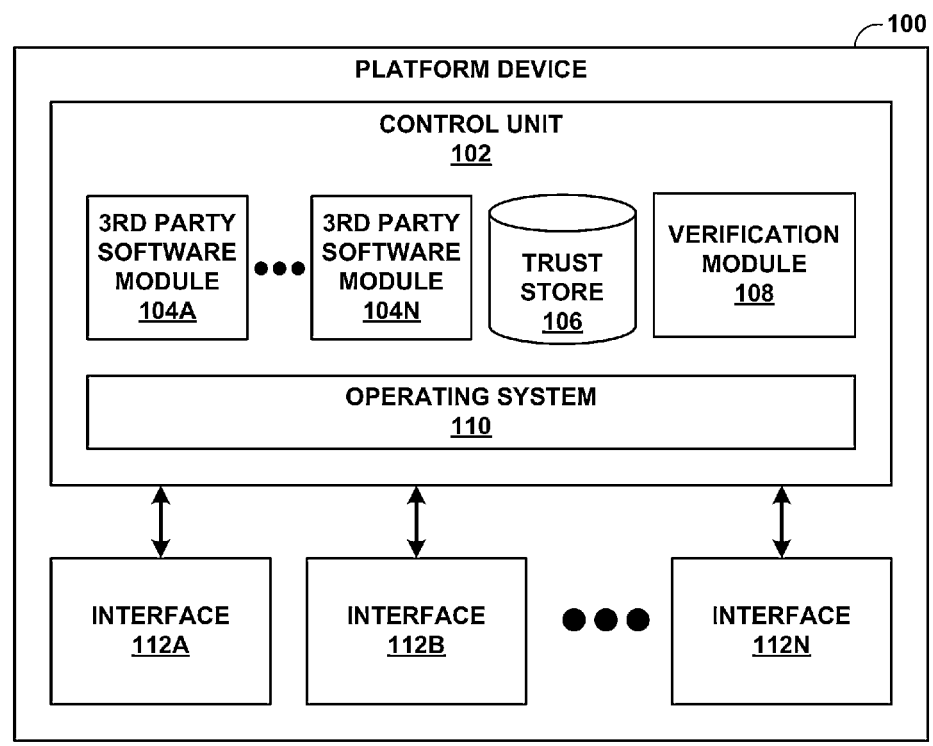
FIG. 4 is a block diagram illustrating an example platform device.

FIG. 4 is a block diagram illustrating an example platform device 100. Platform device 100 represents an example of a platform of a type developed by platform producer 20 (FIG. 1). That is, platform device 100 may have been produced by platform producer 20, or designed by platform producer 20 and produced by a separate entity.

In this example, platform device 100 includes control unit 102 and interfaces 112A-112N (interfaces 112). Interfaces 112 may comprise user interfaces, system interfaces, network interfaces, or the like for receiving input and/or providing output to an external entity. Control unit 102 may comprise one or more hardware-based processing units, such as one or more microprocessors, and memory for storing instructions, such that the processing units execute the instructions stored in the memory. In this example, control unit 102 includes third party software modules 104A-104N ($3^{rd}$ party software modules 104), trust store 106, verification module 108, and operating system 110. Thus, as noted above, a memory of control unit 102 may store instructions for third party software modules 104, verification module 108, and operating system 110, as well as data for trust store 106, such that the processing units can execute the instructions.

Platform device 100 represents a platform that can execute software developed using the SDK provided by platform producer 20. In particular, third party software modules 104 represent software packages developed by third party software developers, such as software developers 30 (FIG. 1). In accordance with the techniques of this disclosure, platform device 100 is configured to authenticate third party software packages prior to installing and/or executing the third party software packages. For example, trust store 106 stores trusted certificates, e.g., one or more certificates associated with a developer of the platform, e.g., certificate authority 22.

For example, trust store 106 may include a root certificate, or a chain of certificates, associated with certificate authority 22. In general, verification module 108 ensures that third party software packages are signed using a certificate that can be traced back to certificate authority 22 of platform producer 20. Because platform device 100 is configured to trust certificate authority 22, in that certificate authority 22 corresponds to platform producer 20, which developed platform device 100, platform device 100 is also configured to determine that certificates and sub-certificates of a software developer that are signed by certificates signed by certificate authority 22 are valid, for the purpose of authenticating software developed by the software developer. For example, verification module 108 may verify a certificate that has a chain of trust leading back to a certificate associated with certificate authority 22. Trust store 106 need not store all certificates associated with certificate authority 22, so long as a chain of certificates has a root corresponding to a certificate associated with certificate authority 22, and the root is stored in trust store 106. Of course, trust store 106 may store additional certificates associated with certificate authority 22 or other trusted entities.

In particular, as discussed above, each of software developers 30 can develop its own certificate hierarchy. Thus, platform device 100 need not be configured to determine whether a software package is signed using a certificate signed by certificate authority 22. Instead, platform device 100 can be configured to determine whether a software package is signed using a sub-certificate that can be traced back to a certificate signed by certificate authority 22.

In accordance with the techniques of this disclosure, verification module 108 recursively checks each certificate in a certificate hierarchy to determine whether the certificate is a certificate associated with certificate authority 22 or whether the certificate is signed by another certificate in the certificate hierarchy. If the root of the certificate hierarchy corresponds to a certificate associated with certificate authority 22, verification module 108 determines that the software package is authentic and can be installed. On the other hand, if the root of the certificate hierarchy does not correspond to a certificate associated with certificate authority 22, verification module 108 determines that the software package cannot be authenticated and causes the software package to be deleted.

Verification module 108 may also check whether the certificates of the certificate hierarchy have expired, and if so, determines that the software package cannot be authenticated. Similarly, verification module 108 may check whether any of the certificates of the certificate hierarchy have been revoked, in which case verification module 108 determines that the software package cannot be authenticated.

As an example, an image of a software package may include data for a signature, a certificate used to sign the software package, and an intermediate certificate chain. Verification module 108 may then ensure that the signature is signed by the signing certificate, and that the intermediate certificate chain can be traced back to the certificate associated with certificate authority 22.

In this manner, platform device 100 can execute third party software modules from different software developers, each of which may have an arbitrary certificate hierarchy structure. Trust store 106 may store a certificate associated with platform producer 20, such that certificate hierarchies for each of the software developers associated with third party software modules 104 can be traced back to the certificate associated with platform producer 20. As long as a software package has a valid chain of trust from the certificate used to sign the software package to a certificate associated with certificate authority 22, verification module 108 can determine that the software package is authentic, that is, that the software package originates from a software developer trusted by platform producer 20. Accordingly, software developers, using an SDK for platforms of the type to which platform device 100 corresponds, can implement arbitrary internal certificate hierarchies, because platform device 100 need only determine that there exists a valid chain of trust leading to certificate authority 22.

Platform device 100 represents an example of a platform device including a control unit configured to receive a first software package signed by a first software developer with a first certificate of a first certificate hierarchy associated with the first software developer, execute the first software package only after determining that a root of the first certificate hierarchy corresponds to a certificate authority of a developer of the platform device, receive a second software package signed by a second software developer with a second certificate of a second certificate hierarchy associated with the second software developer, wherein the second certificate hierarchy is different than the first certificate hierarchy, and execute the second software package only after determining that a root of the second certificate hierarchy corresponds to the certificate authority of the developer of the platform device.

Figure 5:
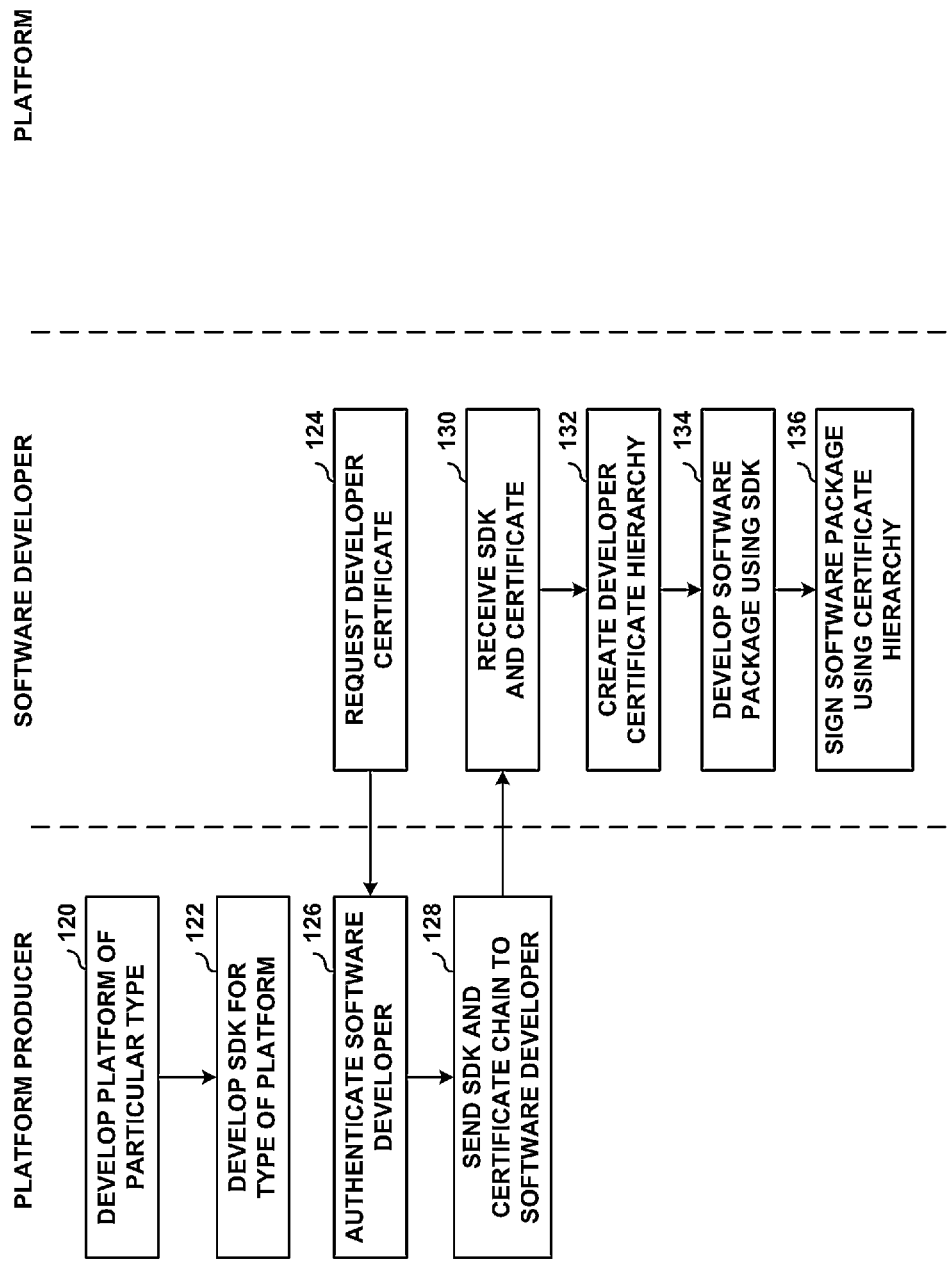
FIG. 5 is a flowchart illustrating an example method for using the techniques of this disclosure to develop a third party software package for a type of platform.

FIG. 5 is a flowchart illustrating an example method for using the techniques of this disclosure to develop a third party software package for a type of platform. The method of FIG. 5 continues to FIG. 6. In this example, there are three entities involved in the method: a platform producer (e.g., platform producer 20 of FIG. 1), a software developer (e.g., one of software developers 30 of FIG. 1, such as software developer 40 of FIG. 2), and a platform (e.g., platform device 100, which may be purchased by one of customers 32 of FIG. 1). For purposes of example, the description of the method of FIGS. 5 and 6 refers to platform producer 20, software developer 40, and platform 100, although it should be understood that other entities may be configured to perform a similar method.

As discussed above, software developer 40 is an entity that is separate from platform producer 20. Therefore, software developed by software developer 40 is considered third-party software, relative to platform device 100, which is produced by platform producer 20. For example, a software package developed by software developer 40 may correspond to one of third-party software modules 104 (FIG. 4).

In the example of FIG. 5, platform producer 20 develops a platform of a particular type (120). For example, platform producer 20 may design hardware elements of the platform, application programming interfaces (APIs) for the platform, an operating system for the platform, and the like. In this example, platform producer 20 also develops a software development kit (SDK) for the platform (122). The SDK allows third party software developers, such as software developer 40, to develop software for the platform. Specifically, the SDK allows third party software developers to develop software for the type of platform developed by platform producer 20. That is, the software may be executable by all platforms of that particular type, and not specifically intended for one instance of the platform device.

In this example, software developer 40 requests a developer certificate from platform producer 20 (124). Specifically, software developer 40 creates a public key and private key pair and submits a certificate signing request associated with the public key to certificate authority 22 of platform producer 20. Certificate authority 22 of platform producer 20 authenticates platform producer 40 (126), e.g., by independently verifying that the certificate signing request originated from software developer 40. Assuming that software developer 40 is properly authenticated and that platform producer 20 determines that software developer 40 is trustworthy, platform producer 20 sends data for the SDK and a signed certificate to software developer 40 (128). It should be understood that the signed certificate includes a certificate chain to a root node of a chain of certificates for platform producer 20. This chain may include one or more certificates. As discussed with respect to FIG. 1, the sending of the SDK and the signed certificate is represented by arrows 24. Of course, data for the SDK and data for the signed certificate may be sent in separate communication sessions and need not be provided together. The certificate from certificate authority 22 of platform producer 20 includes permissions that allow software developer 40 to sign sub-certificates.

After receiving the SDK and the certificate (130), software developer 40 creates a developer certificate hierarchy (132). That is, in accordance with the techniques of this disclosure, software developer 40 (namely, one or more security personnel of software developer 40, such as a security officer) ensures that each individual actor within software developer 40 has a unique public key and private key pair, and that private keys are not shared among actors. The certificate hierarchy may include certificates at various levels for different types of actors, such as IT personnel, managers, programmers, and the like. As discussed above, some public key and private key pairs may be maintained strictly for the purpose of signing sub-certificates. Department certificates 54 represent examples of certificates for such public key and private key pairs. The developer certificate hierarchy may be considered a sub-hierarchy of a full certificate hierarchy that includes the certificate chain for platform producer 20, in addition to the developer certificate hierarchy.

In any case, software developer 40 ensures that each public key and private key pair is associated with a certificate that can be traced back to the certificate received from certificate authority 22 of platform producer 20. That is, each of the certificates is signed by the certificate received from certificate authority 22 or a sub-certificate thereof. In this manner, software developer 40 creates a certificate hierarchy having a root node corresponding to the certificate associated with certificate authority 22 of platform producer 20.

Software developer 40 also develops a software package using the SDK received from platform producer 20 (134). In general, individual actors of software developer 40 contribute software elements to the software package, e.g., using workstations similar to workstation device 80 of FIG. 3. The individual actors then sign their software elements for purposes of testing on a test platform device, and provide the tested software elements to build server 64 (FIGS. 2 and 3). Build server 64, in turn, compiles the software elements received from the various actors and builds the final software package. Build server 64 then signs the software package using its certificate of the certificate hierarchy (136). The signed software package includes data for the certificate hierarchy of software developer 40 and the certificate chain for platform producer 20 as well.

Figure 6:
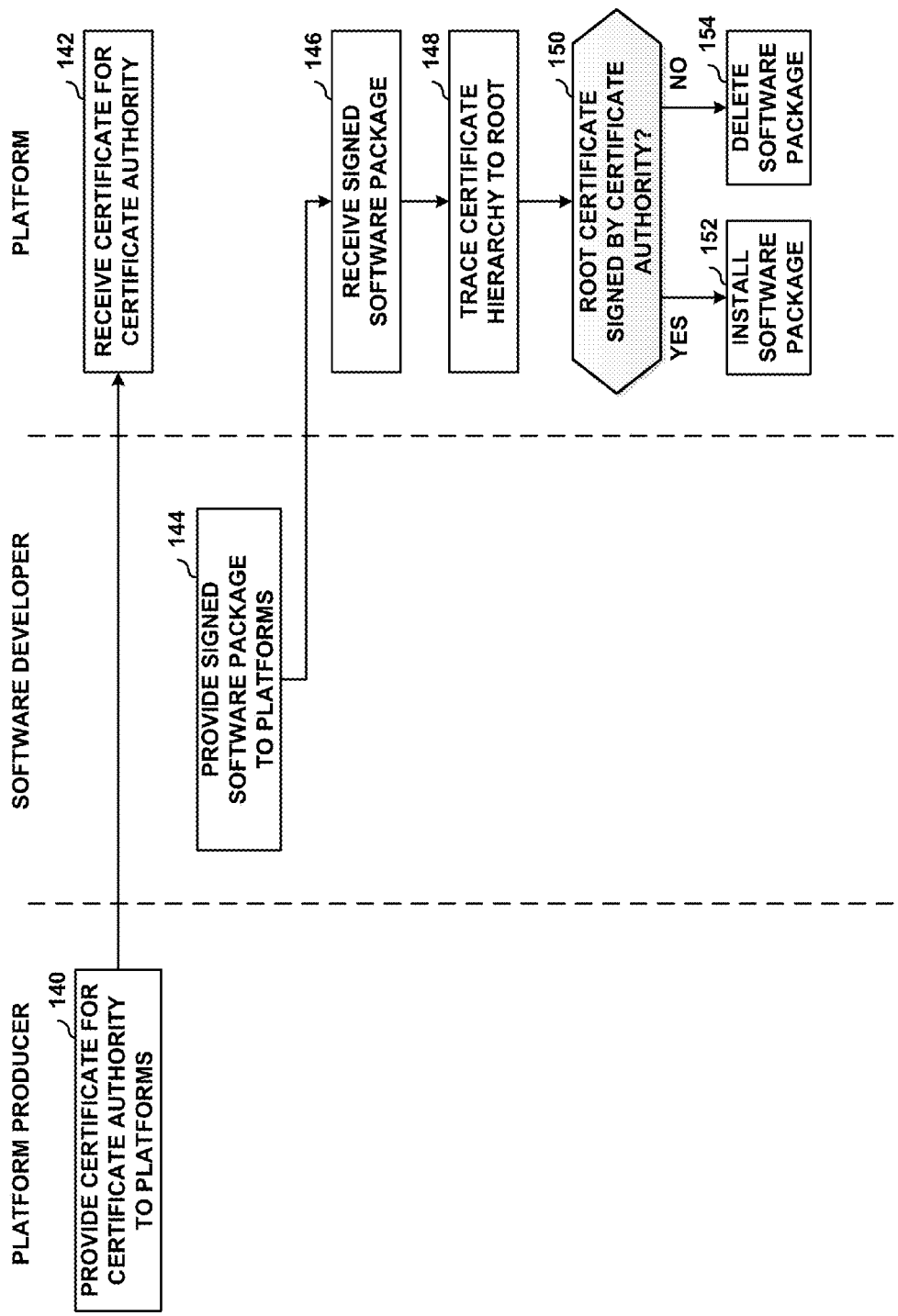
FIG. 6 is a flowchart illustrating an example method for using the techniques of this disclosure for a platform to authenticate a third party software package.

FIG. 6 is a flowchart illustrating an example method for using the techniques of this disclosure for a platform to authenticate a third party software package. The method of FIG. 6 continues from the method of FIG. 5. During development of the particular type of platform, platform producer 20 provides a certificate for certificate authority 22 of platform producer 20 to the platforms of the developed type (140), and platform device 100 receives the certificate for certificate authority 22 (142). For example, the certificate for certificate authority 22 may be stored as data represented by trust store 106 of FIG. 4 within platform device 100. It should be understood that these steps of the method may occur at an earlier time of the method, e.g., during development of the type of platform. Moreover, the certificate from platform producer 20 may include a certificate chain from a root level certificate of platform producer 20 to a certificate used to sign a certificate signing request from software developer 40.

Subsequently, software developer 40 provides the signed software package to platforms of the type produced by platform producer 20 (144). For example, software developer 40 may transmit the signed software package directly to a requesting platform, to a software repository, such as an online marketplace, store data for the signed software package on a computer-readable storage medium, or otherwise make the software package available to the platforms.

Accordingly, platform device 100 receives the signed software package (146) after the software package has been made available. Starting with the certificate used to sign the software package (e.g., server certificate 66 of build server 64), platform device 100 traces the certificate hierarchy to the root certificate of the certificate hierarchy (148). That is, for each certificate, platform device 100 determines whether the certificate is expired, whether the certificate has been revoked, and whether the certificate is a root of the certificate hierarchy. This process continues until the root is discovered, or platform device 100 determines that a certificate in the certificate hierarchy is revoked or expired. If a certificate in the certificate hierarchy is revoked or expired, platform device 100 may delete the software package. If the certificate was merely expired, platform device 100 may request an updated version of the software package that was signed within an expiration date for the corresponding certificate.

After reaching the root certificate, platform device 100 determines whether the root certificate corresponds to a certificate of certificate authority 22 of platform producer 20 (150). For example, the certificate of certificate authority 22 is paired with a public key of certificate authority 22. Platform device 100 may, therefore, verify the certificate at the root of the certificate hierarchy using the public key associated with the certificate from certificate authority 22 to determine whether the certificate at the root of the certificate hierarchy is associated with certificate authority 22. If the data is correctly verified, platform device 100 determines that the certificate at the root of the certificate hierarchy is associated with certificate authority 22 ("YES" branch of 150), and may therefore install and execute the software package (152). On the other hand, if the data cannot be correctly verified (e.g., if the data resulting from an encryption/decryption process using the public key cannot be interpreted), platform device 100 determines that the certificate at the root of the certificate hierarchy is not associated with certificate authority 22 ("NO" branch of 150), in which case platform device 100 deletes the data of the software package (154).

It should be understood that steps of the method of FIGS. 5 and 6 may be performed by multiple different software developers, each of which may create their own unique certificate hierarchies. In this manner, the method of FIGS. 5 and 6 represents an example of a method including receiving, by a platform device, a first software package signed by a first software developer with a first certificate of a first certificate hierarchy associated with the first software developer, executing, by a control unit of the platform device, the first software package only after determining that a root of the first certificate hierarchy corresponds to a certificate authority of a developer of the platform device, receiving, by the platform device, a second software package signed by a second software developer with a second certificate of a second certificate hierarchy associated with the second software developer, wherein the second certificate hierarchy is different than the first certificate hierarchy, and executing, by the control unit of the platform device, the second software package only after determining that a root of the second certificate hierarchy corresponds to the certificate authority of the developer of the platform device.

Likewise, the method of FIGS. 5 and 6 represents an example of a method including receiving a certificate from a certificate authority associated with a developer of a type of platform device, constructing a certificate hierarchy including a plurality of hierarchically arranged certificates including, as a root of the certificate hierarchy, the certificate from the certificate authority associated with the developer of the platform device, signing data of a software package developed for the type of platform device using one or more certificates of the certificate hierarchy, and providing the signed software package and data for the certificate hierarchy to one or more platform devices of the type of platform device developed by the developer.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
receiving, by a platform device manufactured by a platform developer, a first software package signed by a first software development entity with a first certificate of a first certificate hierarchy created by the first software development entity, wherein the first certificate is granted to the first software development entity by a certificate authority of the platform developer, wherein the first certificate comprises a root of the first certificate hierarchy, wherein the first certificate hierarchy conforms to a first hierarchical structure of entities within the first software development entity, and wherein the first software development entity is separate from the platform developer;

executing, by a control unit of the platform device, the first software package only after traversing the first certificate hierarchy to the root of the first certificate hierarchy and verifying that the root of the first certificate hierarchy corresponds to the certificate authority of the platform developer;

receiving, by the platform device, a second software package signed by a second software development entity with a second certificate of a second certificate hierarchy created by the second software development entity, wherein the second certificate is granted to the second software development entity by the certificate authority of the platform developer and wherein the second certificate comprises a root of the second certificate hierarchy, wherein the second certificate hierarchy conforms to a second hierarchical structure of entities within the second software development entity, wherein the second certificate hierarchy is different than the first certificate hierarchy, wherein the second software development entity is separate from the first software development entity, and wherein the second software development entity is separate from the platform developer; and executing, by the control unit of the platform device, the second software package only after traversing the verifying certificate hierarchy to the root of the second certificate hierarchy and verifying that the root of the second certificate hierarchy corresponds to the certificate authority of the platform developer.

2. The method of claim 1, wherein executing the first software package comprises executing the first software package only after determining that the root of the first certificate hierarchy corresponds to a certificate signed by the certificate authority of the developer of the platform device; and wherein executing the second software package comprises executing the second software package only after determining that the root of the second certificate hierarchy corresponds to a certificate signed by the certificate authority of the developer of the platform device.

3. The method of claim 2, further comprising:

wherein executing the first software package comprises executing the first software package only after determining that the certificate signed by the certificate authority was used to sign a subsequent certificate of the first certificate hierarchy; and wherein executing the second software package comprises executing the second software package only after determining that the certificate signed by the certificate authority was used to sign a subsequent certificate of the second certificate hierarchy.

4. The method of claim 1, further comprising:

installing the first software package only after determining that the root of the first certificate hierarchy corresponds to the certificate authority of the developer of the platform device; and installing the second software package only after determining that the root of the second certificate hierarchy corresponds to the certificate authority of the developer of the platform device.

5. The method of claim 1, further comprising:

deleting data associated with the first software package after determining that the root of the first certificate hierarchy does not correspond to the certificate authority of the developer of the platform device; and deleting data associated with the second software package after determining that the root of the second certificate hierarchy does not correspond to the certificate authority of the developer of the platform device.

6. A platform device manufactured by a platform developer, the platform device comprising a control unit configured to:

receive a first software package signed by a first software development entity with a first certificate of a first certificate hierarchy created by the first software development entity, wherein the first certificate is granted to the first software development entity by a certificate authority of the platform developer and wherein the first certificate comprises a root of the first certificate hierarchy, wherein the first certificate hierarchy conforms to a first hierarchical structure of entities within the first software development entity, and wherein the first software development entity is separate from the platform developer, execute the first software package only after traversing the first certificate hierarchy to the root of the first certificate hierarchy and verifying that the root of the first certificate hierarchy corresponds to the certificate authority of the platform developer, receive a second software package signed by a second software development entity with a second certificate of a second certificate hierarchy created by the second software development entity, wherein the second certificate is granted to the second software development entity by the certificate authority of the platform developer and wherein the second certificate comprises a root of the second certificate hierarchy, wherein the second certificate hierarchy conforms to a second hierarchical structure of entities within the second software development entity, wherein the second certificate hierarchy is different than the first certificate hierarchy, wherein the second software development entity is separate from the first software development entity, and wherein the second software development entity is separate from the platform developer, and execute the second software package only after traversing the second certificate hierarchy to the root of the second certificate hierarchy and verifying that the root of the second certificate hierarchy corresponds to the certificate authority of the platform developer.

7. The platform device of claim 6, wherein the control unit is further configured to execute the first software package only after determining that the root of the first certificate hierarchy corresponds to a certificate signed by the certificate authority of the developer of the platform device, and execute the second software package only after determining that the root of the second certificate hierarchy corresponds to a certificate signed by the certificate authority of the developer of the platform device.

8. The platform device of claim 7, wherein the control unit is further configured to execute the first software package only after determining that the certificate signed by the certificate authority was used to sign a subsequent certificate of the first certificate hierarchy, and execute the second software package only after determining that the certificate signed by the certificate authority was used to sign a subsequent certificate of the second certificate hierarchy.

9. The platform device of claim 6, wherein the control unit is further configured to install the first software package only after determining that the root of the first certificate hierarchy corresponds to the certificate authority of the developer of the platform device, and install the second software package only after determining that the root of the second certificate hierarchy corresponds to the certificate authority of the developer of the platform device.

10. The platform device of claim 6, wherein the control unit is further configured to delete data associated with the first software package after determining that the root of the first certificate hierarchy does not correspond to the certificate authority of the developer of the platform device, and delete data associated with the second software package after determining that the root of the second certificate hierarchy does not correspond to the certificate authority of the developer of the platform device.

11. A computer-readable storage medium comprising instructions that, when executed, cause a processor of a platform device manufactured by a platform developer to:
receive a first software package signed by a first software development entity with a first certificate of a first certificate hierarchy created by the first software development entity, wherein the first certificate is granted to the first software development entity by a certificate authority of the platform developer and wherein the first certificate comprises a root of the first certificate hierarchy, wherein the first certificate hierarchy conforms to a first hierarchical structure of entities within the first software development entity, and wherein the first software development entity is separate from the platform developer;
execute the first software package only after traversing the first certificate hierarchy to the root of the first certificate hierarchy and verifying that the root of the first certificate hierarchy corresponds to the certificate authority of the platform developer;
receive a second software package signed by a second software development entity with a second certificate of a second certificate hierarchy created by the second software development entity, wherein the second certificate is granted to the second software development entity by the certificate authority of the platform developer and wherein the second certificate comprises a root of the second certificate hierarchy, wherein the second certificate hierarchy conforms to a second hierarchical structure of entities within the second software development entity, wherein the second certificate hierarchy is different than the first certificate hierarchy, wherein the second software development entity is separate from the first software development entity, and wherein the second software development entity is separate from the platform developer; and
execute the second software package only after traversing the second certificate hierarchy to the root of the second certificate hierarchy and verifying that the root of the second certificate hierarchy corresponds to the certificate authority of the developer of the platform device, wherein the developer of the platform device is separate from the second software development entity.

12. The computer-readable storage medium of claim 11, further comprising instructions that cause the processor to:
execute the first software package only after determining that the root of the first certificate hierarchy corresponds to a certificate signed by the certificate authority of the developer of the platform device; and
execute the second software package only after determining that the root of the second certificate hierarchy corresponds to a certificate signed by the certificate authority of the developer of the platform device.

13. The computer-readable storage medium of claim 12, further comprising instructions that cause the processor to:
execute the first software package only after determining that the certificate signed by the certificate authority was used to sign a subsequent certificate of the first certificate hierarchy; and
execute the second software package only after determining that the certificate signed by the certificate authority was used to sign a subsequent certificate of the second certificate hierarchy.

14. The computer-readable storage medium of claim 11, further comprising instructions that cause the processor to:
install the first software package only after determining that the root of the first certificate hierarchy corresponds to the certificate authority of the developer of the platform device; and
install the second software package only after determining that the root of the second certificate hierarchy corresponds to the certificate authority of the developer of the platform device.

15. The computer-readable storage medium of claim 11, further comprising instructions that cause the processor to:
delete data associated with the first software package after determining that the root of the first certificate hierarchy does not correspond to the certificate authority of the developer of the platform device; and
delete data associated with the second software package after determining that the root of the second certificate hierarchy does not correspond to the certificate authority of the developer of the platform device.

16. A method comprising:
receiving, by one or more hardware-based processors of a computing device of a software development entity, a certificate from a certificate authority associated with a developer of a platform device;
constructing, by the one or more hardware-based processors using the certificate from the certificate authority, a certificate hierarchy including a plurality of hierarchically arranged certificates including, as a root of the certificate hierarchy, the certificate from the certificate authority associated with the developer of the platform device, wherein the certificate hierarchy conforms to a hierarchical structure of entities within the software development entity, and wherein the software development entity is separate from the developer of the platform device;
after determining that a software package was developed for the platform device by one or more of the entities within the software development entity, signing, by the one or more hardware-based processors, data of the software package using the certificate from the certificate authority; and
providing, by the one or more hardware-based processors, the signed software package and data for the certificate hierarchy to one or more platform devices of the platform device developed by the developer.

17. The method of claim 16, wherein constructing the certificate hierarchy comprises:
causing individual ones of the entities within the software development entity to construct individual public key and private key pairs; and
signing certificate signing requests from the actors using a certificate of the certificate hierarchy to issue certificates authenticating the respective public key and private key pairs for the individual actors from whom the certificate signing requests are signed.

18. The method of claim 17, further comprising:
issuing a certificate to a build server of the software development entity, wherein the certificate issued to the build server is signed by at least one other certificate of the certificate hierarchy;
receiving, by the build server, data for the software package from one of the individual actors;
incorporating the data for the software package with other data for the software package; and
signing a version of the software package including the incorporated data using the certificate issued to the build server.

19. The method of claim 16, wherein constructing the certificate hierarchy comprises:
signing certificates for department-level actors using the certificate received from the certificate authority associated with the developer of the platform device;
signing certificates for actors within each department using the respective certificates of the department; and
including the department-level actor certificates and the certificates for actors within each department in the certificate hierarchy.

20. The method of claim 16,
wherein the certificate hierarchy comprises a plurality of certificates each at a particular level of the hierarchy such that the certificate at the root of the hierarchy corresponds to level 1 and, for any level N of the hierarchy where N>1, a certificate at level N is signed by a certificate at level N−1, and
wherein providing data for the certificate hierarchy comprises providing a signed certificate used to sign the software package and providing signed certificates along a path of the certificate hierarchy from the root of the certificate hierarchy to the signed certificate used to sign the software package.

* * * * *